Dec. 8, 1925.
1,564,633
F. W. SIDE
METER POINTER
Filed April 8, 1925
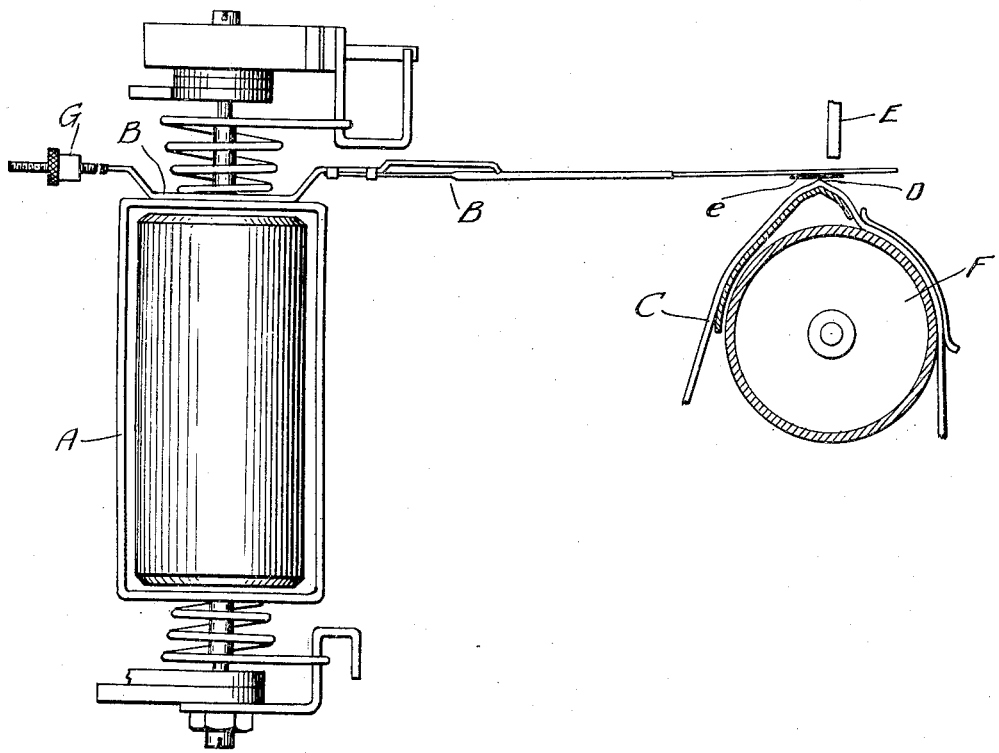
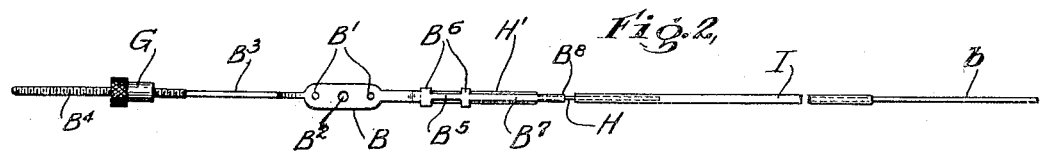
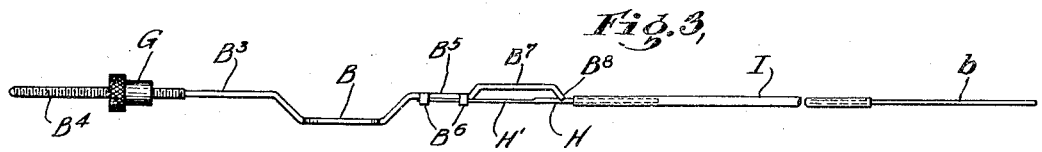
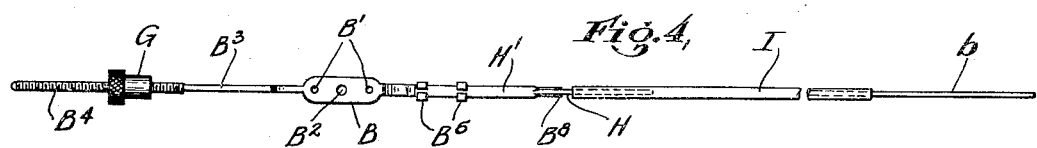
INVENTOR
Frederick W. Side
BY
John E. Hubbell
ATTORNEY Patented Dec. 8, 1925.

1,564,633

UNITED STATES PATENT OFFICE.

FREDERICK W. SIDE, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

METER POINTER.

Application filed April 8, 1925. Serial No. 21,572.

*To all whom it may concern:*

Be it known that I, FREDERICK W. SIDE, a citizen of the United States, and resident of Philadelphia, in the county of Philadelphia and State of Pennsylvania, have invented certain new and useful Improvements in Meter Pointers, of which the following is a specification.

My present invention relates to recording meters of the type in which the pointer of a galvanometer or analogous delicate and sensitive meter element is intermittently engaged by a depressor and deflected into contact with a record sheet, or with a transfer medium between the pointer and the record sheet to thereby make a record on the latter. The general object of the present invention is to provide an improved pointer for use in an instrument of the type described.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of my invention.

Of the drawings:

Fig. 1 is a somewhat diagrammatic elevation of a portion of a recording instrument;

Fig. 2 is a plan view of the needle or pointer element of the meter;

Fig. 3 is a side elevation; and

Fig. 4 is an inverted plan view of the pointer.

In the drawings, Fig. 1 illustrates in a somewhat diagrammatic way a recording meter comprising a movable meter element A carrying a pointer B. D represents an anvil toward which the tip $b$ of the pointer is depressed at intervals by an intermittently operated depressor E to thereby form a record on a record strip C drawn over the anvil D by a record strip feed roll F, a carbon paper strip or analogous transfer medium $e$ being interposed between the pointer tip $b$ and the anvil D.

The improved meter pointer B with which the present invention is concerned, comprises a body part having a flattened portion resting on the upper end of the movable element and secured to the latter by fastening means passing through openings B' in said flattened portion. $B^2$ represents a hole formed in the flattened portion of the pointer body part for the passage of the shaft A' of the movable element A. At the rear of its flattened portion the pointer body part is formed with an uprising and rearwardly extending portion terminating in a threaded wire or rod $B^4$ on which an adjustable counter-weight G is screwed.

A horizontal portion $B^5$ of the pointer body part in front of the flattened portion of the latter, and preferably off-set to be located at a higher level, has secured against its under side a flat spring H' advantageously formed by flattening a portion of a fine wire or rod H of hardened bronze or other strong and resilient material. The spring H' is secured against the body portion $B^5$ by integral clip projections $B^6$ from the latter which are bent over the edges of the spring. Part of the unflattened portion of the wire or rod H is inserted, and is snugly held in the bore of a tubular sleeve I which forms the major portion of the length of the pointer, and in the outer end of which is inserted and held a rod or wire which forms the pointer tip $b$. The pointer body part also includes a horizontal portion $B^7$ vertically displaced upward away from the spring H' and terminating at its front end in a downwardly extending portion $B^8$ against which the unflattened portion of the rod H is normally held with light pressure by the resiliency of the spring H'. The pointer parts B, I, and $b$ are preferably formed of aluminum.

The pointer hereinbefore described, possesses important advantages for its intended use and possesses the somewhat contradictory characteristics desirable for such use. It may be of very light weight, desirable to minimize the inertia of the meter element to which it is attached, while at the same time possessing sufficient strength and rigidity to insure against angular displacement of the pointer tip $b$ relative to the meter element by which it is carried about the axis of the latter. The provision of the flat spring H' gives a highly desirable flexibility to the meter pointer in the direction of the plane including the pointer, and the axis of rotation of the meter element which materially reduces the force required to deflect the tip $b$ into contact with the transfer medium $e$. In the practical use of the invention it has been found that the force required to deflect the meter tip $b$ into its record forming position is only about one fifth as great as is required in the case of pointers heretofore employed in recording meters of the same type. The importance of this reduction in deflecting force required becomes apparent when account is taken of the fact that the deflecting force applied to the pointer involves a corresponding reaction against the delicate bearings or suspension means for the meter element A. The greater flexibility in a vertical direction is obtained moreover, with a pointer which is relatively simple and inexpensive in construction. The tendency of the meter pointer to vibrate in a vertical plane when, following a record impression, the depressor E moves upward out of contact with the pointer, is prevented by the damping action of the pointer body part $B^3$ against which the unflattened portion of the spring rod H then moves.

An appreciation of the practical problems solved by the invention may be facilitated by taking proper account of the fine dimensions and delicate character of the meter pointer. For example, in one form of pointer constructed in accordance with the present invention for commercial use, the flat spring $H'$ is 4.5 thousandths of an inch thick. The tube I has an internal diameter of 23 thousandths of an inch, and an external diameter of 26 thousandths of an inch, while the length of the pointer measured from the free end of the tip $b$ to the hole $B^2$ is about 6 and $\frac{1}{8}$ inches. It will be understood, of course, that the dimensions stated above are given by way of illustration and not by way of limitation.

In effect the part H forms a simple and effective spring hinge connection between the pointer body and the outer section of the pointer and the form of this connection may be varied without departing from the spirit of the invention as set forth in the appended claims, and some features of the invention may sometimes be used with advantage without a corresponding use of other features.

Having now described my invention, what I claim as new and desire to secure by Letters Patent is:

1. A meter pointer adapted for use in a recording meter of the pointer depressing type comprising a relatively rigid pointer body adapted to be secured to a movable meter element, a second part constituting the free end portion of the pointer, and a separate flat spring forming a spring hinge connection between said body and part.

2. A meter pointer adapted for use in a recording meter of the pointer depressing type, comprising a body portion adapted to be secured to the movable element of the meter, a separate pointer part formed of aluminum and constituting the free end portion of the pointer and a spring hinge connection between said body and said part comprising a thin flat spring of material stronger and more resilient than aluminum.

3. A meter pointer adapted for use in a recording meter of the pointer depressing type comprising a body portion adapted to be secured to the movable element of the meter, a separate pointer part formed of aluminum and constituting the free end portion of the pointer, a spring forming a hinge connection between said body and said part, and means for damping vibrations of said hinge connection comprising a projection from said body part engaging a portion of the pointer nearer its free end than the connection between said spring and body part.

4. A meter pointer adapted for use in a recording meter of the pointer depressing type comprising a body portion adapted to be secured to the movable element of the meter, an outer pointer part formed with a socket in its end adjacent said body part and a connection between said pointer body and part formed by a wire having one end inserted in said socket and a flattened portion secured to said body part.

5. A meter pointer adapted for use in a recording meter of the pointer depressing type comprising a body part adapted to be secured to a movable meter element and formed with clip projections, a tube forming an outer section of the pointer, a wire inserted in the end of the tube adjacent said body part and formed with a flattened portion extending underneath said bottom part and secured to the latter by said projections.

Signed at Philadelphia, in the county of Philadelphia, and State of Pennsylvania, this sixth day of April, A. D. 1925.

FREDERICK W. SIDE.